(12) United States Patent
Adams et al.

(10) Patent No.: US 7,741,578 B2
(45) Date of Patent: Jun. 22, 2010

(54) GAS SHIELDING STRUCTURE FOR USE IN SOLID FREE FORM FABRICATION SYSTEMS

(75) Inventors: Robbie J. Adams, Phoenix, AZ (US); Michael W. Bruce, Gilbert, AZ (US); Tom Erion, Chandler, AZ (US); John Tryniski, Queen Creek, AZ (US)

(73) Assignee: Honeywell International Inc., Morristown, NJ (US)

( * ) Notice: Subject to any disclaimer, the term of this patent is extended or adjusted under 35 U.S.C. 154(b) by 347 days.

(21) Appl. No.: 11/962,901

(22) Filed: Dec. 21, 2007

(65) Prior Publication Data
US 2009/0102098 A1 Apr. 23, 2009

Related U.S. Application Data

(60) Provisional application No. 60/981,304, filed on Oct. 19, 2007.

(51) Int. Cl.
*B23K 10/00* (2006.01)
(52) U.S. Cl. .......................... 219/121.36; 219/121.47; 219/76.16; 427/446
(58) Field of Classification Search ............ 219/121.36, 219/121.37, 121.39, 121.45, 121.59, 121.48, 219/121.58; 426/446, 450, 452
See application file for complete search history.

(56) References Cited

U.S. PATENT DOCUMENTS

| 1,746,191 | A | | 2/1930 | Devers |
| 2,856,510 | A | * | 10/1958 | Jones et al. ................... 219/74 |
| 3,673,373 | A | * | 6/1972 | Lovett ......................... 219/74 |
| 3,994,429 | A | | 11/1976 | Hallenbeck et al. |
| 4,139,758 | A | | 2/1979 | Pinfold |
| 4,672,173 | A | | 6/1987 | Nomura et al. |
| 5,171,360 | A | | 12/1992 | Orme et al. |
| 5,960,853 | A | | 10/1999 | Sterett et al. |
| 6,084,197 | A | * | 7/2000 | Fusaro, Jr. ............. 219/121.47 |
| 6,371,362 | B1 | * | 4/2002 | Mehta et al. ................ 228/212 |
| 6,787,726 | B2 | | 9/2004 | Thelen et al. |
| 7,168,935 | B1 | | 1/2007 | Taminger et al. |
| 7,220,935 | B2 | | 5/2007 | Ireland et al. |

* cited by examiner

*Primary Examiner*—Mark H Paschall
(74) *Attorney, Agent, or Firm*—Ingrassia Fisher & Lorenz, P.C.

(57) ABSTRACT

A solid free form fabrication (SFF) system and method is used to fabricate a three-dimensional structure in a continuous manner from successive layers of feedstock material. The system includes a gas shielding structure that is configured to protect a targeted region from oxidation. The system further includes a positioning arm coupled to the deposition head and moveable to align the deposition head with a targeted region of the three-dimensional structure and a plurality of control components coupled to the positioning arm for controlling a position of the positioning arm and operation of the deposition head. The gas shielding structure is formed as either a parallelepiped structure or a half disc structure and may be conformable to at least one surface of the three-dimensional structure.

15 Claims, 2 Drawing Sheets

GAS SHIELDING STRUCTURE FOR USE IN SOLID FREE FORM FABRICATION SYSTEMS

CROSS-REFERENCE TO RELATED APPLICATION

This application claims the benefit of U.S. Provisional Application No. 60/981,304 filed Oct. 19, 2007.

TECHNICAL FIELD

The present invention generally relates to the fabrication of parts and devices, and more particularly relates to the shielding of a workpiece during solid free-form fabrication processes.

BACKGROUND

Solid free-form fabrication (SFF) is a designation for a group of processes that produce three dimensional shapes from additive formation steps. SFF does not implement any part-specific tooling. Instead, a three dimensional component is often produced from a graphical representation devised using computer-aided modeling (CAM). This computer representation may be, for example, a layer-by-layer slicing of the component shape into consecutive two dimensional layers, which can then be fed to control equipment to fabricate the part. Alternatively, the manufacturing process may be user controlled instead of computer controlled. Generally speaking, a component may be manufactured using SFF by successively building feedstock layers representing successive cross-sectional component slices. Although there are numerous SFF systems that use different components and feedstock materials to build a component, SFF systems can be broadly described as having an automated platform/positioner for receiving and supporting the feedstock layers during the manufacturing process, a feedstock supplying apparatus that directs the feedstock material to a predetermined region to build the feedstock layers, with the individual layers solidifying prior to deposition of the next layer. An energy source is directed toward the predetermined region. The energy from the energy source modifies the feedstock in a layer-by-layer fashion in the predetermined region to thereby manufacture the component as the successive layers are built onto each other.

One recent implementation of SFF is generally referred to as ion fusion formation (IFF). With IFF, a torch such as a plasma, gas tungsten arc, plasma arc welding, or other torch with an orifice is incorporated in conjunction with a stock feeding mechanism to direct molten feedstock to a targeted surface such as a base substrate or an in-process structure of previously-deposited feedstock. A component is built using IFF by applying small amounts of molten material only where needed in a plurality of deposition steps, resulting in net-shape or near-net-shape parts without the use of machining, molds, or mandrels. The deposition steps are typically performed in a layer-by-layer fashion wherein slices are taken through a three dimensional electronic model by a computer program. A positioner then directs the molten feedstock across each layer at a prescribed thickness.

There are also several other SFF process that may be used to manufacture a component. SFF processes can be sub-divided into subcategories such as additive manufacturing with further sub categories of direct metal deposition (DMD) and selective laser sintering (SLS) to name just a few. DMD is a process whereby metal is melted then placed where needed to build a three-dimensional part. SLS on the other hand spreads a layer of powder on a table then selectively fuses the appropriate portion to build a three-dimensional component. Typically, during the SFF process a desired shape is built in a chamber with inert gas or a vacuum to protect the liquid and solidified metal from oxidation. It would be an advantage to be able to build components especially large components with localized shielding to protect the deposit in lieu of a gas tight or vacuum tight chamber. However, most of the gas shields constructed for IFF systems are cylindrical shaped for use with relatively small components. These small cylindrical shaped shields effectively protect the top deposition layer of the workpiece being built, thereby enabling a sound interface with the next layer. These cylindrical shields are not effective in protecting the sides of the workpiece from oxidation. However, this current generation of all cylindrical shields has been effective because the limited oxidation on the sides of the workpiece is machined away subsequent to fabrication of the workpiece.

One of the greatest potential advantages but also a great challenge of SFF processes, and more particularly ion fusion formation (IFF) processes is that of achieving a net shape build or near net build, thereby reducing or eliminating the need for subsequent machining. As machining is reduced, the overall cost of the component is reduced. Thus, protecting of the sides form oxidation and therefore reduction of machining due to oxidation would be most beneficial. Accordingly, SFF systems, but most especially IFF may benefit from localized shielding for large structures, especially plate or plate like structures. Current localized shielding deigns do not cover sufficient area to protect the sides from oxidation. While these issues are most directly suited to IFF, any solutions could also be suited to other energy beam forms of SFF such as laser based systems, electron beam systems, or the like.

Hence, there is a need for a shielding structure that minimizes side aspect oxidation of a workpiece fabricated using solid free-form fabrication (SFF) processes.

BRIEF SUMMARY

The invention described in this disclosure supports the creation of a gas shielding structure, and more particularly an improved gas shielding structure that provides for the shielding of a workpiece to minimize oxidation near a fused area in solid free-form fabrication (SFF) systems, such as ion fusion formation (IFF) systems.

In one particular embodiment, and by way of example only, there is provided a solid free form fabrication (SFF) system for fabricating three-dimensional structures in a continuous manner with successive layers of a feedstock material. The system comprises a deposition head operable to emit an energy beam in a path and to feed the feedstock material into the path of the energy beam, the feedstock material melting at a deposition point when introduced into the path and defining a fused area and a hot area extending beyond the fused area.

The system further comprises a gas shielding structure configured to protect the fused area and the hot area from oxidation, a positioning arm coupled to the deposition head and moveable to align the deposition head with a targeted region of a three-dimensional structure to manufacture the three-dimensional structure by transferring the feedstock material in a controlled manner by melting the feedstock material at the deposition point and allowing it to re-solidify at the fused area, and a plurality of control components coupled to the positioning arm for controlling a position of the positioning arm and operation of the deposition head.

In yet another embodiment, and by way of example only, there is provided a solid free form fabrication (SFF) system for fabricating three-dimensional structures in a continuous manner with successive layers of a feedstock material. The system comprises a plasma discharge positioned to emit a plasma stream in a plasma path, a feedstock feed mechanism operable to feed the feedstock material into the plasma path of the plasma discharge, a positioning arm coupled to the plasma discharge and the feedstock feed mechanism to form a deposition head, whereby the positioning arm is positionable to align the deposition head with a targeted region to fabricate a three-dimensional structure by transferring the feedstock material from the feedstock feed mechanism to the targeted region in a controlled manner by melting the feedstock material at a deposition point and allowing it to re-solidify at the targeted region, a control platform coupled to the positioning arm, the control platform including a plurality of control components, whereby a plurality of customizable control parameters are input into the plurality of control components and provide positioning and repositioning of the positioning arm and operation of the deposition head, and a three-dimensional gas shielding structure positioned to encompass at least the deposition head and the targeted region to protect the targeted region from oxidation.

In still another embodiment, and by way of example only, there is provided a solid free form fabrication (SFF) method for fabricating three-dimensional structures in a continuous manner with successive layers of a feedstock material. The method comprising the steps of: providing a positioning arm including a deposition head mounted thereto, the deposition head creating a plasma stream in a plasma path; feeding the feedstock material into the plasma path; providing a plurality of control components coupled to a control platform, whereby the positioning arm is coupled to the control platform, the plurality of control components are programmable to control the positioning arm whereby a plurality of customizable control parameters are input into the plurality of control components, the plurality of customizable control parameters configured to maintain current amperage and travel speed such that an energy level of the plasma stream is optimized to fuse the feedstock material at a predetermined targeted region; positioning a gas shielding structure to substantially encompass the deposition head and at least the predetermined targeted region of a three-dimensional structure; and positioning the positioning arm to align the deposition head relative to the predetermined targeted region to fabricate the three-dimensional structure in the predetermined targeted region.

DETAILED DESCRIPTION OF PREFERRED EMBODIMENTS

The following description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
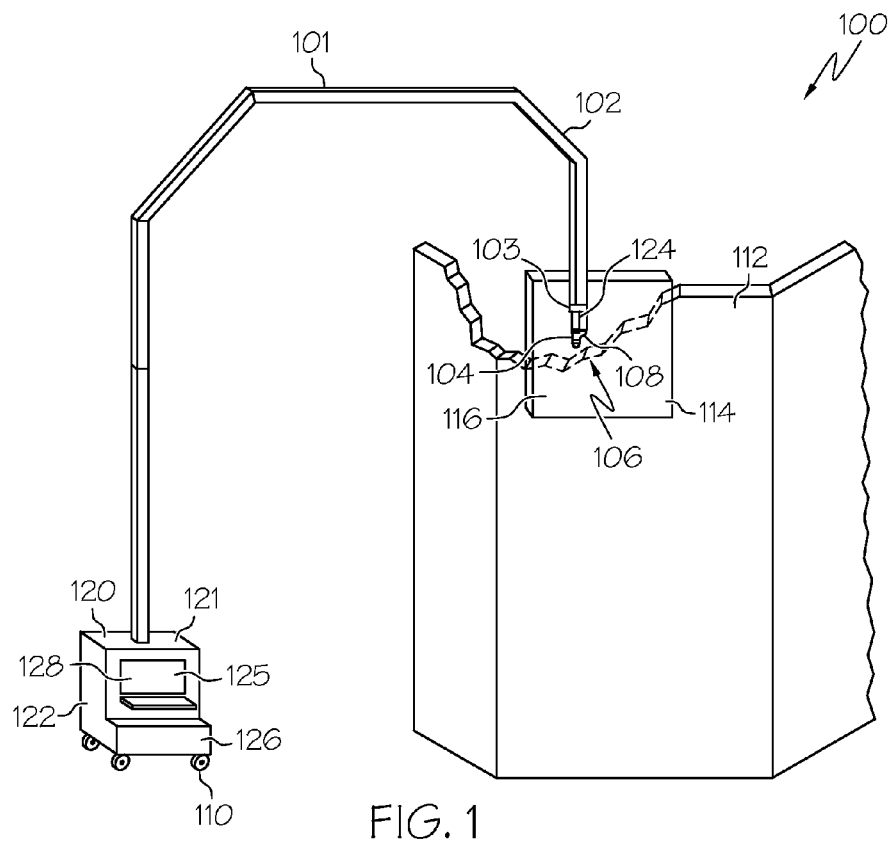
FIG. 1 is a perspective view of an IFF system according to an embodiment of the invention.

FIG. 1 is a perspective view an IFF system 100 for three-dimensional fabrication, which includes a positioning arm 102, having formed at a distal end 103, a deposition head 104. The deposition head 104 has formed as a part thereof a heating energy beam 106 that functions in cooperation with a feedstock feed mechanism 108 positioned in close proximity to a workpiece 116, to build up the structure being fabricated in a continuous or layer-by-layer manner. Examples of heating energy beam 106 may include, but are not limited to electromagnetic beams, including laser beams or the like, particle beams, such as electron beams or ion beams, and plasma beams, such as gas tungsten arc, plasma arc, or the like. The positioning arm 102 aids in continuously positioning and repositioning the IFF system 100 relative to the workpiece 116 in a manner whereby feedstock material may be added to it through the feedstock feed mechanism 108 at predetermined deposition points. More specifically, the IFF system 100 is moveably disposed relative to the structure, and more particularly the workpiece 116, being fabricated and includes a moving means 110 for moving the IFF system 100 relative to the structure being fabricated. The positioning arm 102 may also be configured to coordinate movement and control of the heating energy beam 106 and the feedstock feed mechanism 108 together with the workpiece to fabricate three-dimensional articles in a predictable, highly selectable, and useful manner. In many instances the positioning arm 102 may include any number of extendable components 101 when necessary to further aid the IFF system 100 in reaching the desired the deposition points. Control of the positioning arm 102 may be achieved by computer-implemented control software or the like. The coordinated heating energy beam 106, the feedstock feed mechanism 108, and the positioning arm 102 provide a highly flexible, manually adaptable, and spontaneously constructible automated system through which a three-dimensional structure 112 may be fabricated in a continuous manner to net or near-net shape.

As illustrated in FIG. 1, the IFF system 100 is positioned relative to the three-dimensional structure 112 desired to be built. In this particular embodiment, the three-dimensional structure 112 is fabricated using the IFF system 100 in a continuous layer-by-layer method so as to eliminate any need for an external support structure, or require only limited support during fabrication. As the three-dimensional structure 112 is built it is designed to support itself. In many instances, as the structure being built increases in size or height, the IFF system 100 is intended to similarly move in height with the built structure in a manner generally similar to a climbing tower crane utilized in the construction field that is configured to move or increase in height with the increasing height of the structure it is helping to build.

Additional elements depicted in FIG. 1 include a control platform 120, including a plurality of control components 121, such as a gas controller 122 that controls gas and/or fluid flow to the heating energy beam 106, which is preferably a plasma welding torch. The plurality of control components 121 are configured to control operation of the deposition head 104 to vary an energy level of the emitted heating energy beam 106, thereby optimizing a heat input level.

An energy beam, such as a plasma or arc power source, referred to herein as a power source 124, supplies the necessary power to the heating energy beam 106. The moveable means for moving the positioning arm 102 relative to the three-dimensional structure 112 being fabricated may include positioners and/or positioning motors 125 that are supplied with positioning signals from an electric drive 126 that is coupled to a computer 128 or other controlling device. The positioning arm 102 may be provided of a sufficient length to allow for positioning of the deposition head 104 separate and apart from the control components 121 and in closer proximity to the three-dimensional structure 112 to be built. It should be understood that while gas controller 122, power source 124, electric drive 126 and computer 128 are illustrated as components being housed within a single housing, in an alternate embodiment they may be formed as separate components being housed within separate housings dependent upon space requirements.

In this particular embodiment the deposition head 104 is positionable relative to a three-dimensional structure being fabricated in a continuous manner by the repositioning of the IFF system 100, and more particularly the positioning arm 102. The deposition head 104 is coupled to the positioning arm 102 that acts in a similar manner to a robotic arm. The deposition head 104 is typically fixably mounted to positioning arm 102, but may be removeably mounted when required. The positioners and/or positioning motors 125 when supplied with positioning signals provide control and movement of positioning arm 102. More specifically, during operation a plurality of customizable control parameters are input to the control components 121 to provide positioning and repositioning of the positioning arm 102. The positioning arm 102 provides positioning of the deposition head 104, including the heating energy beam 106 and the feedstock feed mechanism 108, in multiple dimensions as needed, for instance along an X, Y, and/or Z axis, including deposition head rotation and tilt, relative to the three-dimensional structure being built.

Figure 2:
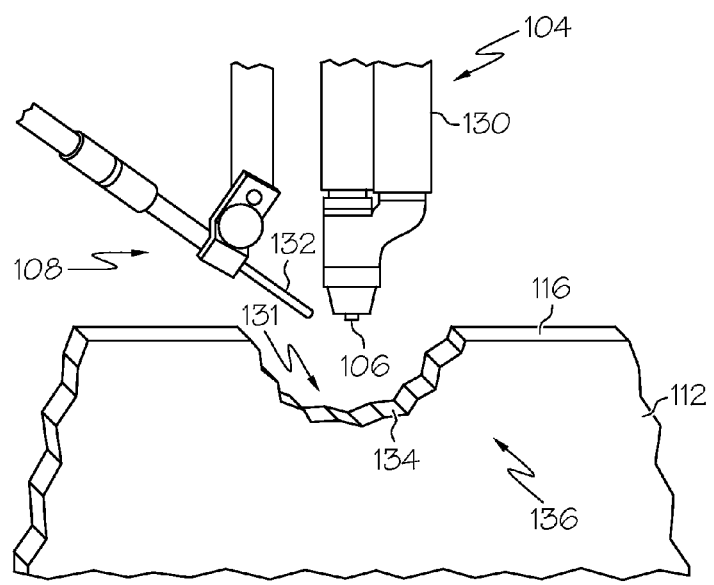
FIG. 2 is a cross-sectional view of a torch from an IFF system according to an embodiment of the invention, the torch functioning in cooperation with a wire feed mechanism, which is depicted in a perspective view.

A closer view of the operating area for the building of the three-dimensional structure 112 is further detailed in FIG. 2. The deposition head 104 includes the heating energy beam 106 in cooperation with the feedstock feed mechanism 108. During operation, an arc electrode (not shown) is positioned inside a nozzle 130 and inside a gas flow channel of heating energy beam 106, and operates to ionize a gas and create a hot argon plasma before the gas exits the nozzle 130. Upon being energized, the argon gas rapidly accelerates from the nozzle 130 toward a targeted region 131 of the structure 112. The feedstock feed mechanism 108 introduces a feedstock material 132 between the heating energy beam 106 and the targeted region 131 of the three-dimensional structure 112 being fabricated. More specifically, the deposition head 104 is operable to emit the heating energy beam 106 in a path by energizing the flowing gas and to feed the feedstock material 132 into the path of the heating energy beam 106. The feedstock material 132 is thereby caused to melt at a deposition point 133 when introduced into the path and define a fused area 134 and a hot area 136 extending beyond the fused area 134. In a preferred embodiment, the heating energy beam 106 is configured to metallurgically bond the feedstock material 132 to a substrate at the targeted region 131 and counteract a heat sink effect of the three-dimensional structure 112. In one particular embodiment, the deposition head 104 includes a plasma torch positioned to emit a plasma stream in a plasma path.

If the heating energy beam 106 is electrical in nature the energy beam can be transferred or non-transferred to the substrate. In an exemplary embodiment, the gas shielding structure 114 (FIG. 1) enables the creation of an electrical circuit including the ionized gas about the targeted region 131 to aid in the acceleration and attraction of the ions from the nozzle 130. The targeted region 131 may be charged by applying a voltage that is opposite of the charge generally present in the ionized plasma gas. The ionized gas is then electrically attracted to the targeted region 131. Use of such electrical charge at the targeted region 131 may also serve to control the direction and distribution of the ionized plasma gas. The degree of attraction between the ions and the targeted region 131 may be controlled by increasing or decreasing the charge present at the targeted region 131.

A noble gas such as argon is preferably ionized using the arc electrode (not shown) positioned near the nozzle 130 of the heating energy beam 106, although alternative inert gases, ions, molecules, or atoms, including, but not limited to, $H_2O$, $CO_2$ and $O_2$, may be used in conjunction with the heating energy beam 106 instead of argon or in combination with argon. These alternative mediators of the plasma energy may include positive and/or negative ions or electrons alone or together with ions. Further, reactive elements may be combined with an inert gas such as argon to optimize performance of the heating energy beam 106. The plasma generating process so energizes the argon gas that the gas temperature is raised to between 5,000 and 30,000K. Consequently, only a small volume of energized argon gas is required to melt feedstock material 132 from the feedstock feed mechanism 108. Nozzles of varying apertures or other orifices may be used to provide specific geometry and plasma collimation for the fabrication of different type structures. Direct beam nozzle orifices may contrast with nozzles having a fan shape or other shapes.

The ionized argon plasma, and all other ionized noble gases, have strong affinity for electrons and will obtain them from the surrounding atmosphere unless the atmosphere consists of gases having equal or higher electron affinity. One advantage of the exemplary three-dimensional IFF system depicted in the drawings does not require a pressurization chamber or other chamber in which the ambient gas is controlled and allows for mobility of the positioning arm 102 and deposition head 104. However, to prevent the ionized argon plasma from obtaining electrons and/or ions from the surrounding atmosphere, i.e. from nitrogen and oxygen typically present in ambient environments, the ionized argon plasma may additionally be sheathed or protected by a curtain of helium, another noble gas, or other inert gases flowing from the nozzle 130 from a coaxial channel (not shown). Helium and other noble gases hold their electrons with a high degree of affinity, and are less susceptible than oxygen or nitrogen to having its electrons taken by the ionized argon plasma.

Any material susceptible to melting by an energy beam, argon ion or other plasma beam may be supplied using a powder feed mechanism or the feedstock feed mechanism 108 as feedstock material 132. Such materials may include steel alloys, aluminum alloys, titanium alloys, nickel alloys, although numerous other materials may be used as feedstock depending on the desired material characteristics such as fatigue initiation, crack propagation, post-fabrication toughness and strength, and corrosion resistance at both welding temperatures and those temperatures at which the structure will be exposed. Specific operating parameters including plasma temperatures, build materials, melt pool parameters, nozzle angles and tip configurations, inert shielding gases, dopants, and nozzle coolants may be tailored to fit an IFF process. U.S. Pat. No. 6,680,456 discloses an IFF system and various operating parameters, and is hereby incorporated herein by reference.

In contrast to previous IFF systems, localized gas shielding is utilized in the IFF system 100 to minimize side aspect oxidation of the three-dimensional structure 112, also referred to herein as the workpiece. More specifically, a shield or gas shielding structure 114, as illustrated in FIG. 1, is formed about the area being worked on at any given time to protect the remaining portion of the built three-dimensional structure 112 from the hot portion. There is no need to protect the entire structure.

Figure 3:
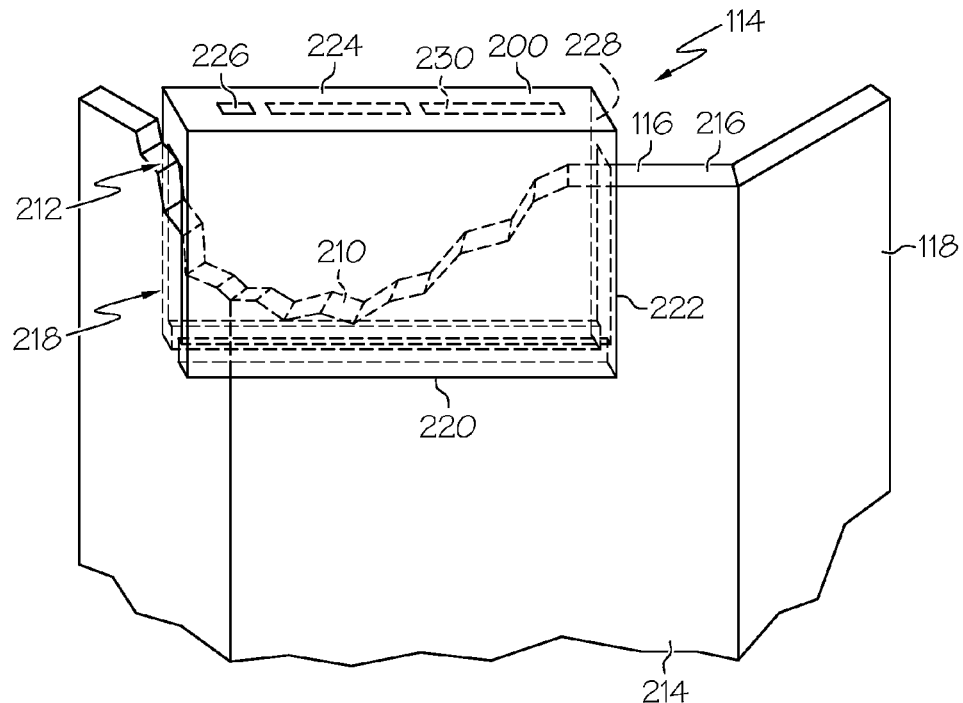
FIG. 3 is a shielding apparatus from an IFF system according to an embodiment of the invention, the shielding apparatus functioning in cooperation with a torch and a wire feed mechanism, which is depicted in a perspective view.

At least two different approaches can be taken to achieve localized gas shielding without the need for a gas or vacuum tight chamber according to the embodiments depicted herein. The entire large deposit or a substantial portion may be enclosed in a stationary or moveable covering when desired. As best illustrated in FIG. 3, a first preferred embodiment described herein includes a gas shielding structure 114 for use in an SFF system in which oxidation of the workpiece build surfaces, near the fusion zone, are minimized. The gas shielding structure 114 includes a large half disc or parallelepiped structure 200 positioned relative to a fused area 210 (illustrated in shadow), or fused deposit, of the workpiece. The gas shielding structure 114, and more particularly the parallelepiped structure 200, extends in at least three dimensions beyond the fused area 210, or fused deposit. The gas shielding structure 114 provides protection for sufficient areas radiating out from the heating energy beam 106 (FIGS. 1 and 2) or other heat source. More specifically, the gas shielding structure 114 provides protection to the point where the temperature of the fused deposit is below the oxidizing temperature. As previously stated, an effective shield against oxidation may be formed as a parallelepiped structure or a half-disc structure wherein the structure 200 is configured to saddle the workpiece at its edges 212. This positioning of the gas shielding structure 114 allows the workpiece 116, which in this preferred embodiment is a plate 118, to be built in the plane of the plate from a lower edge 214 to an upper edge 216. While the disclosed gas shielding structure is described in conjunction with a workpiece in the form of a plate, alternative structures in the form of large hollow shapes, such as a cylinder or hollow box-like structure are anticipated by this disclosure.

In this embodiment of the gas shielding structure 114, a hollow three-dimensional parallelepiped structure 200, is configured to be open on at least three edges 218, 220, and 222, and includes a solid top 224 formed parallel to the deposition plane and extends down the sides on opposed sides of the plate 118. The parallelepiped structure 200 is configured solid at the top, except for openings allowing for gas entrance or vacuum lines (not shown), a connection to a holding/traversing fixture (not shown), and an energy beam 226, for example heating energy beam 106 or other heat source. A preferred embodiment provides for the delivery of a gas to an uppermost portion of the gas shielding structure 114, with subsequent branching to cover the entire area that is at or above the oxidation temperature. The gas shielding structure 114 is formed sufficiently wide to traverse across the width of the workpiece 116, and more particularly the plate 118, and enable a deposition equal to the required width. Flexible coverings (not shown) may be formed at the open edges 218, 220 and 222 to minimize escape of gas and/or the entrance of air into the gas shielding structure 114. The entire gas shielding structure 114 must be prevented from being a short circuit path for the electric arc, i.e. the arc current is not allowed to pass through the gas shielding structure 114 without passing through the workpiece 116 first.

One approach for gas delivery into the gas shielding structure 114 provides for a plurality of perforations 228 on an interior surface of the top 224 and side portions 218 and 222 of the gas shielding structure 114 to enable a wide distribution of gas. Another approach for gas delivery within the gas shielding structure 114 includes the use of internal flow channels 230 (shown in shadow). Both gas delivery approaches provide for the distribution of gas at the rates required to reach all points. In addition, the gas shielding structure 114 may be configured to be flexible during early deposit build such that the gas shielding structure 114 may compress during the first few passes during the build process, but then expand as the deposition grows in size, i.e. height. Alternatively, or in addition to, the gas shielding structure 114 may be configured to rise relative to the heating energy beam 106, or other heat source, during the build process.

In an alternate embodiment, a chamber that is open at both ends can envelop either the entire plate-like structure or a large portion of it. This would enable continuous traverse of the plate 118 through the shielding as it grows in size. Provision would need to be made for the energy beam 106 to move relative to the top of the chamber so as to start the deposition process then rise in the vertical direction as the plate 118 grew. However, by eliminating the need for a gas tight enclosure, there is a reduction in cost and an increase in flexibility.

Figures 4, 5:
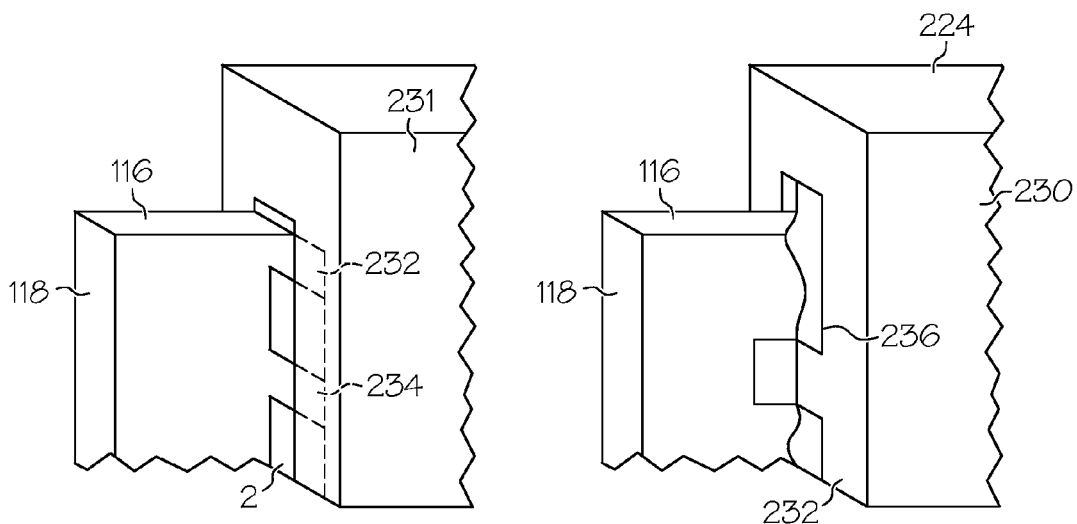
FIGS. 4 and 5 show a shielding apparatus from an IFF system according to another embodiment of the invention, the shielding apparatus functioning in cooperation with a torch and a wire feed mechanism, which is depicted in a perspective view.

In alternative embodiments of the gas shielding structure illustrated in FIGS. 4 and 5, a gas shielding structure 231 is formed including a plurality of side portions 232 that are arranged to conform to surfaces of the workpiece 116, or plate 118. Conforming of the plurality of side portions 232 may be accomplished by a combination of at least one slide mechanism 234 as best illustrated in FIG. 4, and/or at least one spring 236, as best illustrated in FIG. 5, to allow the side portions 232 of the gas shielding structure 231 to extend and closely approach the workpiece 116 when it is less than the maximum width of the local shielding afforded by the shielding structure 231. Alternatively, the top portion 224 of the gas shielding structure 231 may be the maximum width and the side portions 218 and 222 configured to pivot about the top edge of the structure through the use of springs, or via an inherent flexibility of the side portions 218 and 222. More specifically, the gas shielding structure 114 may be configured to include side portions that bend until they almost touch each other at rest with no workpiece in place, but expand to greater than the width of the workpiece, where protuberances project from the plane of the workpiece.

The gas shielding structure, while described primarily for a torch deposit based system, may also be applied to any energy beam based system such as laser or electron beam SFF systems, etc. The latter would include a partial vacuum or in some instances no vacuum that could be incorporated into the shielding system. Shielding of the workpiece may be achieved by applying loads to the outer edges of the gas shielding structure to provide contact between the shielding structure and the workpiece. In addition, single or multiple hard or resilient contacts at the shielding structure edges may prevent or minimize air passage beyond the edges for an inert gas or vacuum system. Finally, while the disclosed gas shielding structure is described in conjunction with a workpiece in the form of a plate with no appurtenances, the shielding structure may be adapted to plates with appurtenance and/or breaks of significant curves.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention.

We claim:

1. A solid free form fabrication (SFF) system for fabricating three-dimensional structures in a continuous manner with successive layers of a feedstock material comprising:
   a deposition head operable to emit an energy beam in a path and to feed the feedstock material into the path of the energy beam, the feedstock material melting at a deposition point when introduced into the path and defining a fused area and a hot area extending beyond the fused area;
   a gas shielding structure positioned to protect the fused area and the hot area from oxidation, the gas shielding structure configured as a discrete parallelepiped structure having a substantially open periphery to provide saddling of the gas shielding structure over and about the fused area and the hot area to provide three-dimensional shielding, the structure further having openings formed therein an uppermost edge surface for positioning of the deposition head therethrough;
   a positioning arm coupled to the deposition head and moveable to align the deposition head with a targeted region of a three-dimensional structure to manufacture the three-dimensional structure by transferring the feedstock material in a controlled manner by melting the feedstock material at the deposition point and allowing it to re-solidify at the fused area; and
   a plurality of control components coupled to the positioning arm for controlling a position of the positioning arm and operation of the deposition head.

2. The system of claim 1, wherein the gas shielding structure includes a plurality of side portions.

3. The system of claim 1, wherein at least one of the top and side portions include one of flow channels or perforations to supply a flow of gas to the targeted region.

4. The system of claim 1, wherein the gas shielding structure conforms to meet at least one surface of the three-dimensional structure.

5. The system of claim 4, wherein the gas shielding structure includes a plurality of sliding components that conform to at least one surface of the three-dimensional structure.

6. The system of claim 1, wherein the gas shielding structure includes a plurality of springs providing conformity of the gas shielding structure to at least one surface of the three-dimensional structure.

7. The system of claim 1, wherein the deposition head includes a plasma torch positioned to emit a plasma stream in a plasma path and a feedstock feed mechanism operable to feed the feedstock material into the plasma path of the plasma torch.

8. The system of claim 1, wherein the plurality of control components include a gas controller, a power source, an electric drive and a computer.

9. The system of claim 1, wherein a plurality of customizable control parameters are input into the plurality of control components for one of manual or automated control of the positioning arm.

10. A solid free form fabrication (SFF) system for fabricating three-dimensional structures in a continuous manner with successive layers of a feedstock material comprising:
    a plasma discharge positioned to emit a plasma stream in a plasma path;
    a feedstock feed mechanism operable to feed the feedstock material into the plasma path of the plasma discharge;
    a positioning arm coupled to the plasma discharge and the feedstock feed mechanism to form a deposition head, whereby the positioning arm is positionable to align the deposition head with a targeted region to fabricate a three-dimensional structure by transferring the feedstock material from the feedstock feed mechanism to the targeted region in a controlled manner by melting the feedstock material at a deposition point and allowing it to re-solidify at the targeted region;

a control platform coupled to the positioning arm, the control platform including a plurality of control components, whereby a plurality of customizable control parameters are input into the plurality of control components and provide positioning and repositioning of the positioning arm and operation of the deposition head; and a three-dimensional gas shielding structure positioned to encompass at least the deposition head and the targeted region to protect the targeted region from oxidation, the gas shielding structure configured as a discrete parallelepiped structure having a substantially open periphery to provide saddling of the gas shielding structure over and about at least the targeted region to provide three-dimensional shielding, the structure further having openings formed therein an uppermost edge surface for positioning of the deposition head therethrough.

11. The system of claim 10, wherein the gas shielding structure includes a plurality of conformable side portions.

12. The system of claim 10, wherein the gas shielding structure includes a plurality of sliding components that conform to at least one surface of the three-dimensional structure.

13. The system of claim 10, wherein the gas shielding structure includes a plurality of springs providing conformity of the gas shielding structure to at least one surface of the three-dimensional structure.

14. A solid free form fabrication (SFF) method for fabricating three-dimensional structures in a continuous manner with successive layers of a feedstock material, the method comprising the steps of:

providing a positioning arm including a deposition head mounted thereto, the deposition head creating a plasma stream in a plasma path;

feeding the feedstock material into the plasma path;

providing a plurality of control components coupled to a control platform, whereby the positioning arm is coupled to the control platform, the plurality of control components are programmable to control the positioning arm whereby a plurality of customizable control parameters are input into the plurality of control components, the plurality of customizable control parameters configured to maintain current amperage and travel speed such that an energy level of the plasma stream is optimized to fuse the feedstock material at a predetermined targeted region;

positioning a gas shielding structure to substantially encompass the deposition head and at least the predetermined targeted region of a three-dimensional structure, the gas shielding structure configured as a discrete parallelepiped structure having a substantially open periphery to provide saddling of the gas shielding structure over and about at least the targeted region to provide three-dimensional shielding, the structure further having openings formed therein an uppermost edge surface for positioning of the deposition head therethrough; and positioning the positioning arm to align the deposition head relative to the predetermined targeted region to fabricate the three-dimensional structure in the predetermined targeted region.

15. The method of claim 14, wherein the gas shielding structure includes a closed top portion and a plurality of conformable side portions.

* * * * *